(12) United States Patent
Miyano et al.

(10) Patent No.: US 7,062,245 B2
(45) Date of Patent: Jun. 13, 2006

(54) RADIO TRANSMISSION APPARATUS AND RADIO RECEPTION APPARATUS

(75) Inventors: Kentaro Miyano, Yokohama (JP); Youichi Nakagawa, Tokyo (JP); Masahiro Mimura, Tokyo (JP); Makoto Hasegawa, Tokyo (JP); Yoshio Koyanagi, Ebina (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 519 days.

(21) Appl. No.: 09/739,817

(22) Filed: Dec. 20, 2000

(65) Prior Publication Data
US 2001/0004605 A1   Jun. 21, 2001

(30) Foreign Application Priority Data
Dec. 21, 1999   (JP) .................................. 11-362282

(51) Int. Cl.
*H04B 1/06*   (2006.01)
*H04B 7/00*   (2006.01)

(52) U.S. Cl. .............................. 455/277.1; 455/562.1; 455/66.1; 455/101

(58) Field of Classification Search ................ 455/562, 455/272, 276.1, 277.1, 561, 103, 101, 25, 455/60, 517, 67.16, 66.1, 562.1, 279.1, 277.2; 343/797, 820, 821, 795
See application file for complete search history.

(56) References Cited

U.S. PATENT DOCUMENTS

| 4,649,393 | A | * | 3/1987 | Rittenbach | 342/371 |
| 5,305,353 | A | * | 4/1994 | Weerackody | 375/347 |
| 5,568,158 | A | * | 10/1996 | Gould | 455/278.1 |
| 6,067,053 | A | * | 5/2000 | Runyon et al. | 343/797 |
| 6,091,970 | A | * | 7/2000 | Dean | 455/562.1 |
| 6,147,648 | A | * | 11/2000 | Granholm et al. | 343/844 |
| 6,300,900 | B1 | * | 10/2001 | Bleret et al. | 342/361 |
| 6,411,824 | B1 | * | 6/2002 | Eidson | 455/561 |
| 6,538,608 | B1 | * | 3/2003 | Muramoto et al. | 343/702 |
| 6,553,239 | B1 | * | 4/2003 | Langston | 455/103 |
| 6,697,641 | B1 | * | 2/2004 | Shapira | 455/562.1 |
| 2003/0073463 | A1 | * | 4/2003 | Shapira | 455/562 |

FOREIGN PATENT DOCUMENTS

JP   4-276926   10/1992

\* cited by examiner

*Primary Examiner*—Edward F. Urban
*Assistant Examiner*—John J. Lee
(74) *Attorney, Agent, or Firm*—Greenblum & Bernstein, P.L.C.

(57) ABSTRACT

Corresponding to transmission data 101, phase controller 105 is controlled to shift a phase of modulated signal 103 by 0° or 180°. Planes of polarization of modulated signals to be transmitted from antennas 106 and 107 are made different from each other corresponding to transmission data 101. The electric field strength of a signal received at antenna 108 changes corresponding to the plane of polarization, thereby voltage value 113 output from electric field strength detector 111 varies corresponding to transmission data 101, and using this variation, judged result 115 is obtained. Two results, namely, demodulated data 112 and judged result 115 are input to comparing circuit 116, whereby the reception apparatus is capable of obtaining received data 117 with high quality.

2 Claims, 5 Drawing Sheets

| 112 : | 1 1 ? 1 ? |
| 115 : | 1 1 −1 1 −1 |
| 117 : | 1 1 −1 1 −1 |

RADIO TRANSMISSION APPARATUS AND RADIO RECEPTION APPARATUS

BACKGROUND OF THE INVENTION

1. Field of the Invention

The present invention relates to a radio transmission apparatus and radio reception apparatus in a digital radio communication.

2. Description of the Related Art

Digital radio communications always have a possibility that a received electric field strength of a signal becomes weak due to geographical conditions because a space is used as a transmission medium. Therefore, when the received electric field strength of the signal is weak, an error rate of data is increased and the data quality deteriorates. An example of measures to cope with the above situation is a technique using a polarization modulation as described in Japanese Laid Open Patent Publication HEI4-276926.

This technique uses a modulation system that represents "1" and "0" of data with polarizations. Specifically in the technique, a transmission apparatus and reception apparatus each is provided with two antennas with different directivities from each other, and the apparatuses communicate signals using antennas with the same directivity. For example, when the transmission apparatus and reception apparatus each is provided with two antennas with different directivities from each other (dextrorotatory and levorotatory), a signal transmitted from a dextro-antenna of the transmission apparatus can be received only at the dextro-antenna of the reception apparatus, and a signal transmitted from a levo-antenna of the transmission apparatus can be received only at the levo-antenna of the reception apparatus.

Accordingly, for example, by determining in advance that transmission data from a dextro-antenna represents "1", and that transmission data from a levo-antenna represents "0", the reception apparatus Is capable of deciding "0" or "0" of data by recognizing that the data is transmitted from either antenna.

However, in the technique, when a signal transmitted, for example, from a dextro-antenna is reflected by a wall or the like, the polarization of the signal is changed and the signal is converted to a signal transmitted from a levo-antenna, whereby the reception apparatus is not capable of deciding the data accurately. Further, in the technique, it is necessary for the reception apparatus to have two antennas, and thereby it is difficult to miniaturize the reception apparatus.

Furthermore, received data rarely has errors and is received with the high quality when a received electric field strength of the signal is strong, however, received data has errors and the quality of the received signal deteriorates when the received electric field strength of the signal is weak.

SUMMARY OF THE INVENTION

It is an object of the present invention to provide a radio transmission apparatus and radio reception apparatus enabling the reception apparatus to receive signals of high quality using a single antenna and further to receive signals of high quality even when received electric field strengths are weak in a modulation system that changes a plane of polarization of a polarization.

It is a subject matter of the present invention that with respect to a variation in received electric field strength due to mismatching of received plane of polarization caused by that the reception apparatus having a single antenna receives signals transmitted from two antennas of the transmission apparatus with the plane of polarization varied, the reception apparatus uses a detected result on the received strength as well as demodulated data as reference data, and thereby obtains received data of high quality using a single antenna even when the received electric field strength is weak.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described specifically below with reference to accompanying drawings.

FIRST EMBODIMENT

Figure 1:
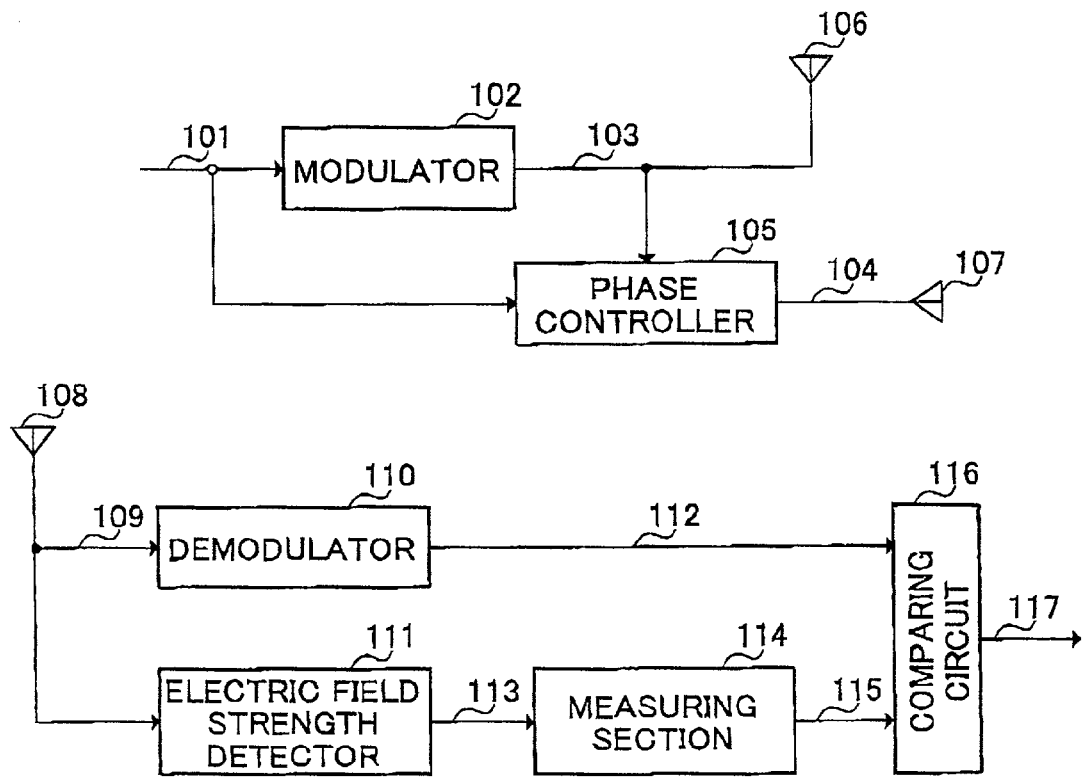
FIG. 1 is a block diagram illustrating configurations of a radio transmission apparatus and radio reception apparatus according to a first embodiment of the present invention.

This embodiment explains a radio transmission apparatus and reception apparatus in which planes of polarization are switched depending on transmission data. FIG. 1 is a block diagram illustrating configurations of the radio transmission apparatus and radio reception apparatus according to the first embodiment of the present invention.

Transmission data 101 is converted into modulated signal 103 in modulator 102, and the signal 103 is transmitted through first linear polarization antenna element 106. Phase controller 105 has a control terminal, and through the terminal, receives transmission data 101 and modulated signal 103 from modulator 102.

Phase controller 105 converts modulated signal 103 corresponding to transmission data 101 into modulated signal 104 with the same phase or with a phase shifted 180°.

Modulated signal 104 is transmitted through second linear polarization antenna element 107. That is, phase controller 105 provides a 180 degrees phase difference to the modulated signal. While the 180 degrees phase shift is provided using phases of 0° and 180° in this embodiment, phases are not limited in particular, and for example, phases of 90° and −90° are usable.

Radio signals transmitted from first linear polarization antenna element 106 and second linear polarization antenna element 107 are received at reception antenna 108, and received signal 109 is output to demodulator 110 and electric field strength detector 111 (for example, received signal strength indicator).

Demodulator 110 converts the radio signal into demodulated data 112, and outputs demodulated data 112 to comparing circuit 117. Electric field strength detector 111 detects an electric field strength of the received signal, and outputs the electric field strength as voltage level 113 to measuring section 114 (for example, comparator circuit).

Measuring section 114 judges data based on voltage level 113. The method of judging data is described later. Judged result 115 is output to comparing circuit 116.

Figure 2:
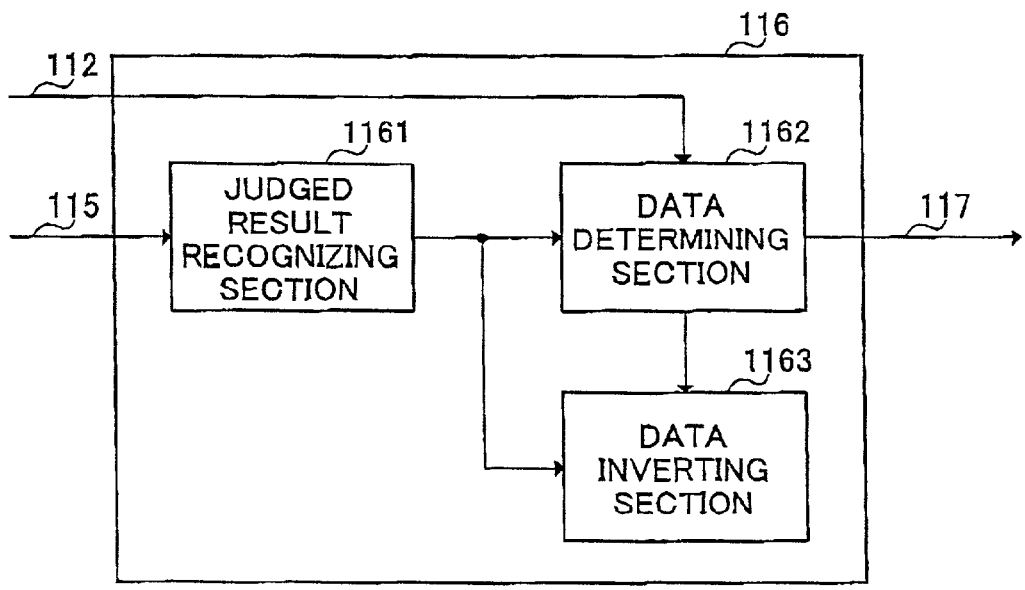
FIG. 2 is a block diagram illustrating a configuration of a measuring section in the radio reception apparatus illustrated in FIG. 1.

As illustrated in FIG. 2, comparing circuit 116 is provided with judged result recognizing section 1161 that recognizes the judged result from measuring section 114, data inverting section 1163 that inverts data corresponding to a judged result indicative of weak electric field strength, and data determining section 1162 that makes a determination on data corresponding to a judged result indicative of strong electric field strength and inverted data.

Comparing circuit 116 compares demodulated data 112 with judged result 115, and based on the compared result, obtains received data. The method of obtaining received data is described later.

A specific explanation is given of a case that the transmission apparatus transmits signals with different planes of polarization using first linear polarization antenna element 106 and second linear polarization antenna 107.

For example, it is assumed that a phase of modulated signal 104 is shifted 0° when transmission data 101 is 1, while being shifted 180° when transmission data 101 is 0 (−1), with respect to modulated signal 103. Therefore when transmission data 101 is 1, modulated signal 103 and modulated signal 104 with the same phases are respectively transmitted from first linear polarization antenna 106 and second linear polarization antenna 107, and when transmission data 101 is 0, modulated signal 103 and modulated signal 104 with the opposite phases (phase shifted 180°) are respectively transmitted from first linear polarization antenna 106 and second linear polarization antenna 107.

Figure 3:
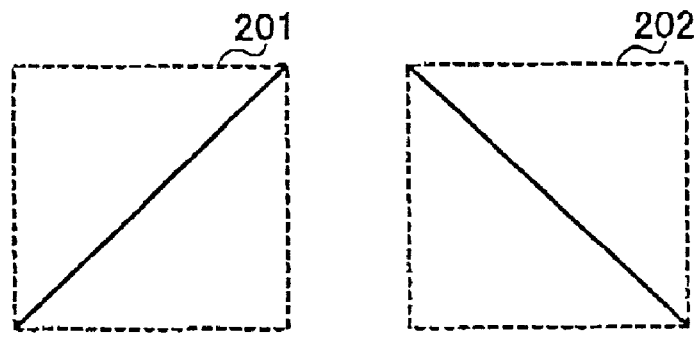
FIG. 3 is a diagram showing planes of polarization to explain different planes of polarization of signals polarized corresponding to transmission data.

Planes of polarization are shown in FIG. 3 on the assumption that a longitudinal direction of first linear polarization antenna 106 is in a vertical direction, a longitudinal direction of second linear polarization antenna 106 is in a horizontal direction and that radio signals transmitted from both antennas have the same power.

Plane of polarization 201 is obtained when transmission data 101 is 1, and plane of polarization 202 is obtained when transmission data 101 is 0. In addition, since only the phase is shifted 180° corresponding to transmission data, various combinations are considered that have planes of perpendicular to each other of signals with 180° phase difference such as a combination of a right-hand circular polarization and left-hand circular polarization, for example, due to a line length to an antenna.

The method of obtaining judged result 115 in the reception apparatus is next explained specifically.

Measuring section 114 judges voltage level 113 output from electric field strength detector 111 as 1 when the received electric field strength is strong, i.e. when voltage level 113 is high, while judging the level 113 as 0 when the received electric field strength is weak, i.e. when voltage level 113 is low, and thereby obtains judged result 115.

A specific explanation is next given of the method of obtaining received data 117 in comparing circuit 116 using demodulated data 112 and judged result 115.

Reception antenna 108 receives a combined signal of radio signals transmitted from first linear polarization antenna element 106 and second linear polarization antenna element 107, and received electric field strengths are different depending on planes of polarization. In other words, the received electric field strength varies depending on transmission data 101.

When the received electric field strength is strong, it is considered that demodulated data 112 is correct. However, when the received electric field strength is weak, a possibility is high that demodulated data 112 is in error. Then, comparing circuit 116 obtains received data 117 using demodulated data 112 and judged result 115.

When judged result 115 is indicative of 1, the received electric field strength is strong, therefore demodulated data 112 is considered to be correct and comparing circuit 116 outputs demodulated data 112 itself as received data 117. However, when judged result 115 is indicative of 0, the received electric field strength is weak, therefore the possibility is high that demodulated data 112 is in error. Then, when the received electric field strength is weak, regardless of the value of demodulated data 112, received data 117 adopts an opposite value to demodulated data 112 obtained when the received electric field strength is strong. That is, comparing circuit 116 outputs 0 when demodulated data 112 at the time judged result 115 is 1 is 1, while outputting 1 when such demodulated data 112 is 0, and thus outputs an inverted result to demodulated data 112 obtained at the time the received electric field strength is strong.

The processing in comparing circuit 116 described above is explained more specifically using FIGS. 4 and 5. A case is herein explained that transmission data 101 is 1, 1, −1, 1, or −1. First explained is a case that the received electric field strength is strong when transmission data 101 is 1.

Transmission data 101 is converted into modulated signal 103 in modulator 102 of the transmission apparatus. Meanwhile, with respect to transmission 101 data, when the data is 1, modulated signal 104 has the same phase as that of modulated signal 103, and when the data is −1, modulated signal 104 is processed in phase controller 105 and has a phase shifted 180° with respect to a phase of the signal 103. Then the modulated signals are transmitted from the antennas 106 and 107 to the reception apparatus. In other words, when the data is 1, the modulated signal transmitted from the antenna 106 and that transmitted from the antenna 107 have the same phases, and when the data is −1, the modulated signal transmitted from the antenna 106 and that transmitted from the antenna 107 have opposite phases. In addition, FIGS. 4 and 5 illustrate a case of frequency modulation.

Figure 4:
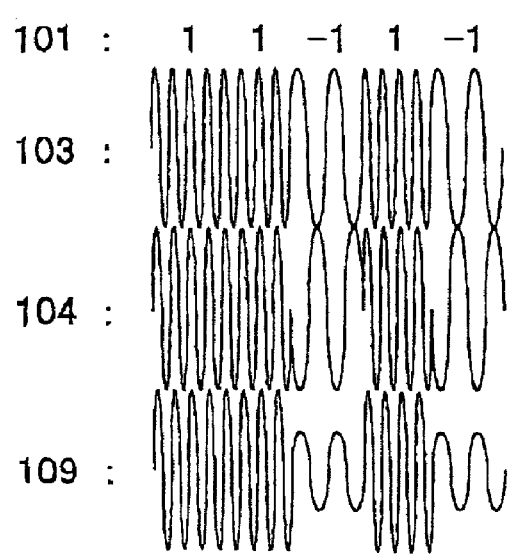
FIG. 4 is a diagram to explain processing in a comparing circuit illustrated in FIG. 2.
Figure 5:
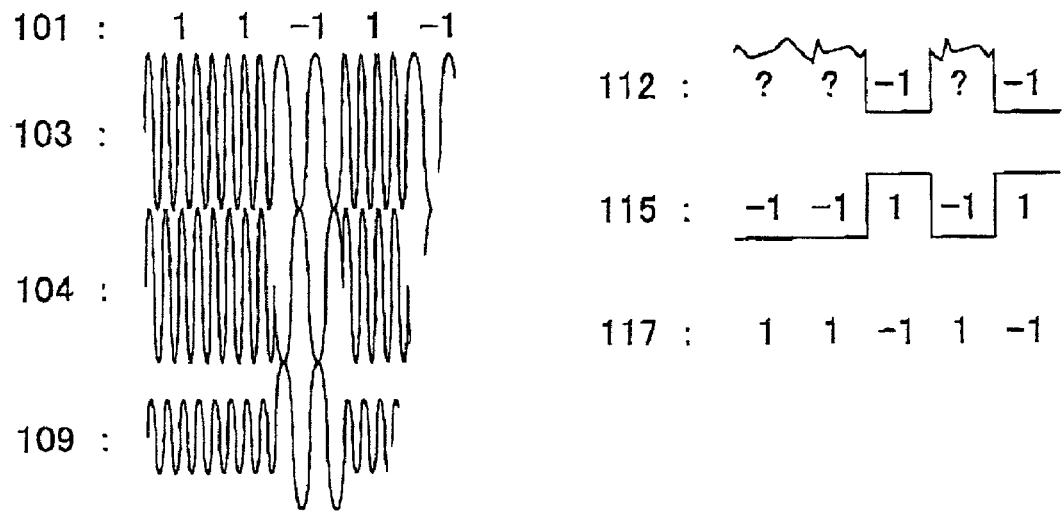
FIG. 5 is another diagram to explain the processing in the comparing circuit illustrated in FIG. 2.

In the reception apparatus, as shown in FIG. 4, modulated signal 109 received at the reception apparatus has a strong received electric field strength and therefore has large amplitude when transmission data 101 is 1, while having a weak received electric field strength and therefore having small amplitude when transmission data 101 is −1. It is because, as explained above, the transmission apparatus transmits signals from antennas providing different planes of polarization, and matching and mismatching of the planes of polarization take place in the reception apparatus.

Accordingly, when transmission data 101 is 1, in other words, when judged result recognizing section 1161 has a judged result of 1, since the received electric field strength is strong, data determining section 1162 determines demodulated data 112 as data of 1 and outputs the data 112 itself as received data 117.

When transmission data 101 is −1, in other words, when judged result recognizing section 1161 has a judged result of −1, since the received electric field strength is weak, the possibility is high that an error occurs on demodulated data 112. Therefore, the reception apparatus is not able to determine whether modulated data 112 is 1 or −1. Then, when judged result recognizing section 1161 has the judged result of −1, the judged result is considered to have low reliability and is not used, and data inverting section 1163 inverts data of 1 obtained when the received electric field strength is strong and outputs the inverted value to data determining section 1162. Data determining section 1162 outputs the inverted value as received data 117 (−1 in this case).

Next explained is a case that the received electric field strength Is strong when transmission data is −1. With respect to transmission data 101, as described above, when the data is 1, modulated signals with the same phases are transmitted from respective antennas 106 and 107, and when the data is −1, modulated signals with inverted phases are transmitted from respective antennas 106 and 107.

In the reception apparatus, as shown in FIG. 5, modulated signal 109 received at the reception apparatus has a weak received electric field strength and therefore has small amplitude when transmission data 101 is 1, while having a strong received field strength and therefore having large amplitude when transmission data 101 is −1.

Accordingly, when transmission data 101 is 1, in other words, when judged result recognizing section 1161 has a judged result of −1, since the received electric field strength is weak, the possibility is high that an error occurs on demodulated data 112. Therefore, the reception apparatus is not able to determine whether modulated data 112 is 1 or −1. Then, when judged result recognizing section 1161 has the judged result of −1, the judged result is considered to have low reliability and is not used, and data inverting section 1163 inverts data of −1 obtained when the received electric field strength is strong and outputs the inverted value to data determining section 1162. Data determining section 1162 outputs the inverted value as received data 117 (1 in this case).

Meanwhile, when transmission data 101 is −1, in other words, when judged result recognizing section 1161 has a judged result of 1, since the received electric field strength is strong, data determining section 1162 determines demodulated data 112 as data of −1 and outputs the data 112 itself as received data 117.

Thus, in the radio transmission apparatus and radio reception apparatus according to this embodiment, regardless of propagation conditions of radio signals, correct received data can be obtained even when the received electric field strength varies corresponding to transmission data.

According to this embodiment as described above, strong received electric field strength and weak received electric filed strength are generated using a difference between transmission data, and when the received electric field strength is strong, the demodulated data is accepted as the received data, while when the received electric field strength is weak, the received data is obtained using a judged result with an output voltage from the electric field strength detector, based on the demodulated data in the demodulator when the received electric field strength is strong. It is thereby possible to improve the reception characteristic. Further, when a reception apparatus does not have a comparing circuit, reception diversity is usable.

Figure 6:
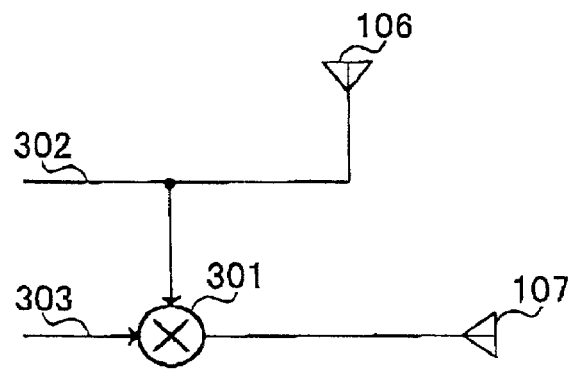
FIG. 6 is a block diagram illustrating an example of a phase controller of the radio transmission apparatus according to the first embodiment of the present invention.

A next explanation is given of a case that a multiplier is used as the phase controller illustrated in FIG. 1. FIG. 6 is a block diagram illustrating an example of the phase controller of the radio transmission apparatus according to the first embodiment of the present invention.

In FIG. 6, multiplier 301 receives as its inputs transmission signal 302 and reference signal 303, multiplies the signal 302 by the signal 303, and outputs the multiplied result to the antenna 107. Assuming that reference signal 303 is 1 or −1, multiplier 303 outputs a signal with the same phase as that of transmission signal 303 to second linear polarization antenna element 107 when reference signal 303 is 1, while outputting a signal with an opposite phase to transmission signal 303 to second linear polarization antenna element 107 when reference signal 303 is −1.

According to the above constitution, it is possible to transmit signals with different planes of polarization corresponding to the reference signal. For example, transmission data and spreading code is used as the reference signal.

Figure 7:
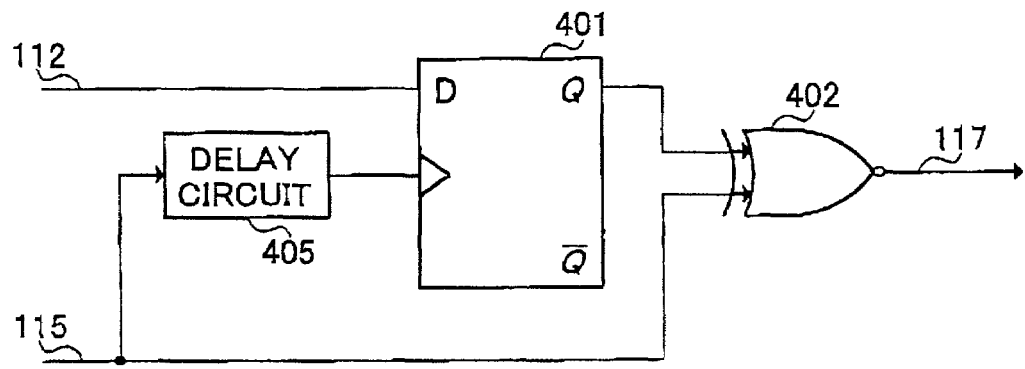
FIG. 7 is a block diagram illustrating an example of the comparing circuit of the radio reception apparatus according to the first embodiment of the present invention.

A next explanation is given of a case that logic circuits are used as the comparing circuit illustrated in FIG. 1. FIG. 7 is a block diagram illustrating an example of the comparing circuit of the radio reception apparatus according to the first embodiment of the present invention.

The comparing circuit of this case is comprised of logic circuits of D-flip flop 401 and X-NOR 402. D-flip flop receives as its input demodulated data 112, and further receives as its gate input judged result 115 delayed in delay circuit 405, X-NOR gate 402 receives as its inputs an output of D-flip flop 401 and judged result 115, and outputs received data 117.

The reason for delaying the gate input is not to synchronize demodulated data 112 with the gate input because D-flip flop 401 outputs a value on a leading edge of the gate input. The delay time needs to be shorter than a cycle of a baseband frequency.

It is assumed that judged result 115 is 1 when the received electric field strength is strong, and that judged result 115 is 0 (−1) when the received electric field strength is weak. When the judged result 115 is 1, the received electric field strength is strong, therefore demodulated data 112 is considered to be correct, and X-NOR 402 outputs demodulated data 112 itself as received data 117.

Meanwhile, when judged result 115 is 0, the received electric field strength is weak, and therefore the possibility is high that demodulated data 112 is in error. Then, when the received electric field strength is weak, regardless of the value of demodulated data 112, received data 117 adopts an opposite value (inverted value) to demodulated data 112 obtained at the time the received electric field strength is strong. Accordingly, when judged result 115 is 0, X-NOR 402 outputs the opposite value to a value obtained at the time judged result 115 is 1 as received data 117. Receive data 117 is thus obtained.

SECOND EMBODIMENT

This embodiment explains a radio transmission apparatus that switches planes of polarization using a spreading code.

Figure 8:
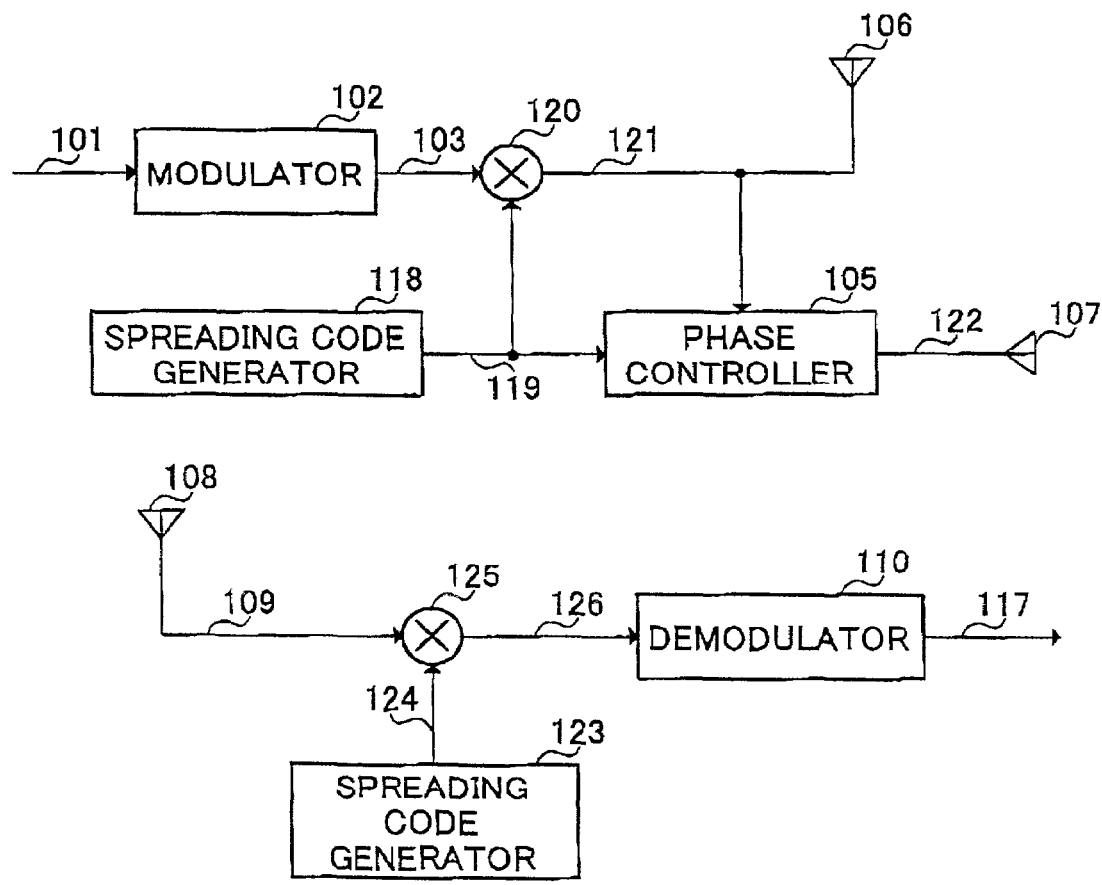
FIG. 8 is a block diagram illustrating configurations of a radio transmission apparatus and radio reception apparatus according to a second embodiment of the present invention.

FIG. 8 is a block diagram illustrating configurations of the radio transmission apparatus and a radio reception apparatus according to the second embodiment of the present invention.

In this embodiment, phase controller 105 receives its inputs spread signal 121 spread with spreading code 119 output from spreading code generator 118 and spreading code 119 generated in spreading code generator 118.

Spread signal 121 is obtained by multiplying modulated signal 103 by spreading code 119 input to multiplier 120. Then, first linear polarization antenna element 106 transmits spread signal 121, and second linear polarization antenna 107 transmits spread signal 122 with a phase changed corresponding to spreading code 119.

Further, in the reception apparatus, multiplier 125 multiplies received radio signal 109 by spreading code 124 output from spreading code generator 123, and thereby obtains despread signal 126. Demodulator 110 demodulates despread signal 126, and thereby obtains received data 117.

The processing of obtaining received data in the reception apparatus is the same as in the first embodiment. While the first embodiment describes changing phases of signals per symbol basis to transmit the signals, this embodiment describes changing phases of signals per chip basis to transmit the signals. This case also exhibits the same effect as in the first embodiment.

Further, by referring to a judged result by an electric field strength detector and measuring section using a variation in the received electric field strength as the reception apparatus in the first embodiment, it is possible to facilitate acquisition of synchronization of the spreading code between the radio transmission apparatus and radio reception apparatus.

According to the present invention as described above, signals are transmitted with different planes of polarization corresponding to the spreading code, whereby the reception apparatus avoids a condition that the received electric filed strength is low due to the mismatching of planes of polarization, without having a particular configuration, and thereby enables improved reception characteristics. Further, it may be possible to apply the diversity reception to a reception apparatus.

THIRD EMBODIMENT

Figure 9:
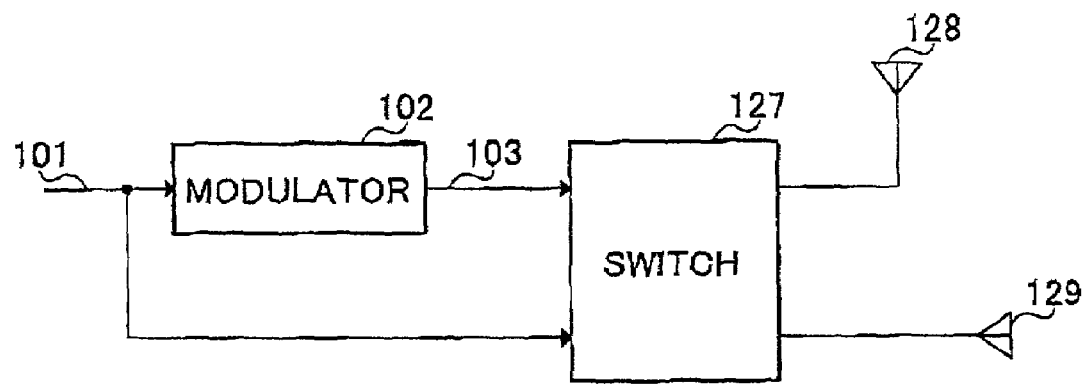
FIG. 9 is a block diagram illustrating a configuration of a radio transmission apparatus according to a third embodiment of the present invention.

This embodiment explains a case of switching two antennas providing different planes of polarization perpendicular to each other as the method of transmitting signals with different planes of polarization in the radio transmission apparatus in the first embodiment. FIG. 9 is a block diagram illustrating a configuration of the radio transmission apparatus in the third embodiment of the present invention.

Switch 127 switches first antenna 128 and second antenna 129 providing different planes of polarization perpendicular to each other depending on transmission data 101. That is, switch 127 judges whether to transmit a signal from first antenna 128 or second antenna 129 corresponding to transmission data 101 to switch as appropriate. In addition, it is predetermined that which antenna is used to transmit a signal corresponding to what value of transmission data.

Thus according to this embodiment, signals are transmitted with different planes of polarization corresponding to the transmission data, whereby the reception characteristics of the reception apparatus can be improved as in the first embodiment.

FOURTH EMBODIMENT

Figure 10:
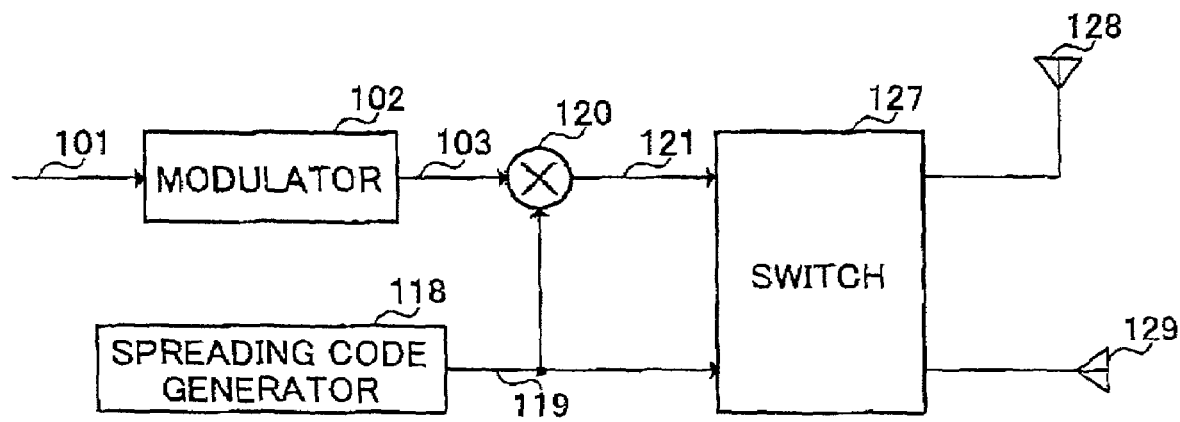
FIG. 10 is a block diagram illustrating a configuration of a radio transmission apparatus according to a fourth embodiment of the present invention.

This embodiment explains a case of switching two antennas providing different planes of polarization perpendicular to each other as the method of transmitting signals with different planes of polarization. FIG. 10 is a block diagram illustrating a configuration of a radio transmission apparatus in the fourth embodiment of the present invention.

Switch 127 switches first antenna 128 and second antenna 129 providing different planes of polarization perpendicular to each other depending on spreading code 119.

Thus according to this embodiment, signals are transmitted with different planes of polarization corresponding to the spreading code, whereby it is possible to avoid a condition that the received electric field strength is low due to the mismatching of planes of polarization in the reception apparatus.

FIFTH EMBODIMENT

This embodiment explains an example that first and second linear polarization antenna elements are not parallel to each other. When a phase controller is controlled in the same way as in the first or second embodiment, modulated signals output to first and second linear polarization antenna elements have the same phases or opposite phases corresponding to the transmission data or spreading code, whereby it is possible to transmit signals with different planes of polarization corresponding to the transmission data and spreading code in the same way as in the first embodiment.

SIXTH EMBODIMENT

This embodiment explains an example of an antenna in which first and second linear polarization antenna elements are located on a plane at a spaced interval and the longitudinal relationship between the elements is indicative of twisted positions.

When a phase controller is controlled in the same way as in the first or second embodiment, modulated signals output to first and second linear polarization antenna elements have the same phases or opposite phases. However, a distance between the first linear polarization antenna element and a reception antenna is different from that between the second linear polarization antenna element and the reception antenna, and therefore the plane of polarization of the transmitted signal is of an ellipse. When a difference between the distances matches with a wavelength of the signal, the plane of polarization is of a straight line. Signals are thereby transmitted with different planes of polarization corresponding to the transmission data or spreading code in the same way as in the first or second embodiment.

SEVENTH EMBODIMENT

This embodiment explains an example of an antenna in which first and second linear polarization antenna elements are located at a spaced interval and the longitudinal relationship between the elements is indicative of non-parallel positions in a space. When a phase controller is controlled in the same way as in the first or second embodiment, signals are transmitted with different planes of polarization corresponding to the transmission data or spreading code in the same way as in the sixth embodiment.

EIGHTH EMBODIMENT

This embodiment explains a radio transmission apparatus using a single antenna capable of transmitting two kinds of polarizations perpendicular to each other. By using the antenna capable of transmitting two kinds of polarizations perpendicular to each other, instead of using two antenna elements in the first or second embodiment, it is possible to switch the polarizations corresponding to the transmission data or spreading code, whereby the reception apparatus avoids a condition that the received electric field strength is low due to the mismatching of polarizations, and thereby enables improved reception characteristics.

A radio transmission apparatus of the present invention is comprised of an antenna composed of first and second linear polarization antenna elements perpendicular to each other, a modulator and a phase controller, and transmits transmission data with different planes of polarization from respective first and second linear polarization antenna elements, where the modulator is connected to the first linear polarization antenna element and converts the transmission data into a modulated signal, and the phase controller is connected to the second linear polarization antenna element, has a control terminal and whenever the transmission data is input to the control terminal, shifts a phase of the modulated signal by 0° or 180° corresponding to the transmission data to output. A reception apparatus is thus provided with added information due to different planes of polarization corresponding to the transmission data, and thereby can improve the communication quality.

A radio transmission apparatus of the present invention is comprised of an antenna composed of first and second linear polarization antenna elements perpendicular to each other, a modulator, a multiplier, a spreading code generator, and a phase controller, and transmits transmission data with different planes of polarization from respective first and second linear polarization antenna elements, where the modulator is connected to the multiplier and converts the transmission data into a modulated signal, the spreading code generator is connected to the multiplier and the phase controller and outputs a spreading code, the multiplier is connected to the first linear polarization antenna element and phase controller and multiples the modulated signal by the spreading code to output a spread signal, and the phase controller is connected to the second linear polarization antenna element, has a control terminal, and whenever the spreading code is input to the control terminal, shifts a phase of the modulated signal by 0° or 180° corresponding to the spreading code to output. A reception apparatus is thus provided with added information due to different planes of polarization corresponding to the spreading code, and thereby can improve the communication quality.

A radio transmission apparatus of the present invention is comprised of first and second antennas providing different planes of polarization perpendicular to each other, a modulator, and a switch to transmit transmission data with different planes of polarization, where the modulator is connected to the switch and converts transmission data into a modulated signal to output, and the switch is connected to the first and the second antennas, has a control terminal, and whenever the transmission data is input to the control terminal, switches an antenna for transmitting the modulated signal to the first antenna or second antenna. A reception apparatus is thus provided with added information due to different planes of polarization corresponding to the transmission data, and thereby can improve the communication quality.

A radio transmission apparatus of the present invention is comprised of first and second antennas providing different planes of polarization perpendicular to each other, a modulator, a multiplier, a spreading code generator, and a switch to transmit transmission data with different planes of polarization, where the modulator is connected to the multiplier and converts the transmission data into a modulated signal to output, the spreading code generator is connected to the multiplier and the switch and outputs a spreading code, the multiplier is connected to the switch and multiplies the modulated signal by the spreading code to output a spread signal, and the switch is connected to the first and second antennas, has a control terminal, and whenever the spreading code is input to the control terminal, switches an antenna for transmitting the spread signal to the first antenna or second antenna. A reception apparatus is thus provided with added information due to different planes of polarization corresponding to the spreading code, and thereby can improve the communication quality.

A radio reception apparatus of the present invention is comprised of a reception antenna, a demodulator, an electric field strength detector, a measuring section and a comparing circuit, and obtains received data from radio signals transmitted with different planes of polarization corresponding to transmission data, where the demodulator is connected to the reception antenna and demodulates a received signal to output demodulated data, the electric field strength detector is connected to the reception antenna and converts the received signal into a voltage value to output, the measuring section is connected to the electric strength field detector and outputs a judged result from the voltage value, and the comparing circuit is connected to the demodulator and the measuring section and outputs received data from the demodulated data and the judged result. According to this constitution, by referring to the judged result as well as the demodulated date, it is possible to obtain received data of high reliability.

A transmission apparatus of the present invention has, in the above constitution, an antenna with longitudinal directions of the first and second linear polarization antenna elements arranged not in parallel to each other, but crossing. It is thereby possible to transmit signals with different planes of polarization corresponding to the transmission data even when the planes of polarization are not perpendicular.

A transmission apparatus of the present invention has, in the above constitution, an antenna with first and second linear polarization antenna elements located on a plane at a spaced interval and with the longitudinal relationship between the elements indicative of twisted positions. It is thereby possible to transmit signals with different planes of polarization corresponding to the transmission data even when the planes of polarization are not perpendicular.

A transmission apparatus of the present invention has, in the above constitution, an antenna with first and second linear polarization antenna elements located at a spaced interval and with the longitudinal relationship between the elements indicative of being not parallel but making an angle. It is thereby possible to transmit signals with different planes of polarization corresponding to the transmission data even when the planes of polarization are not perpendicular.

A radio transmission apparatus of the present invention uses a multiplier as the phase controller in the above constitution, where the multiplier multiplies a transmission signal by a reference signal to output, and a polarity of the transmission signal is inverted depending on whether the reference signal is 1 or −1. It is thereby possible to transmit signals with different planes of polarization corresponding to the reference signal.

In the radio reception apparatus of the present invention in the above constitution, a comparing circuit uses a D-flip flop receiving as its input data to be corrected and as its gate input a delayed judged result, and an X-NOR gate receiving its inputs an output of the D-flip flop and the judged result, and corrects the data using reference data. Thus using two kinds of data enables the apparatus to obtain data with high reliability.

The radio transmission apparatus of the present invention has, in the above constitution, a single antenna capable of transmitting two kinds of polarizations perpendicular to each other, and of switching the polarizations corresponding to transmission data or spreading code. The reception apparatus is thus provided with added information due to different planes of polarization corresponding to the transmission data or spreading code, and thereby can improve the communication quality.

According to the present invention as described above, signals are transmitted with different planes of polarization corresponding to transmission data or spreading codes, whereby a variation In received electric field strength is caused by mismatching with a received plane of polarization of a reception antenna, and the use of information on the variation of the received electric field strength enables the apparatus to receive signals with accuracy using a single antenna.

In other words, when a plane of polarization is changed corresponding to transmission data, demodulated data obtained at the time of strong received electric field strength is accepted as received data, and at the time of weak received electric field strength, the received data is obtained based on the demodulated data at the time of strong received electric field strength, using a judged result with an output voltage from an electric field strength detector. It is thereby possible to obtain received data with the high quality. Further the reception apparatus is required to have only a single antenna, and it is thereby possible to miniaturize the reception apparatus.

The present invention is not limited to the above described embodiments, and various variations and modifications may be possible without departing from the scope of the present invention.

This application is based on the Japanese patent Application No. HeI11-362282 filed on Dec. 21, 1999, entire content of which is expressly incorporated by reference herein.

What is claimed is:

1. A radio reception apparatus, comprising:
   a receiver that receives a first signal transmitted in a predetermined polarization plane and a second signal transmitted in a polarization plane different from the predetermined polarization plane;
   an electric field strength detector that detects a received electric field strength of said first signal and said second signal; and
   a determiner that, upon processing said first signal and said second signal, performs data determination on an as-is basis with respect to data of a signal of a strong electric field strength, and, that, with respect to data of a signal of a weak electric field strength, inverts said data of said signal of said strong electric field strength to make said determination, said signal of a weak electric field strength being weaker than said signal of a strong electric field strength.

2. The radio reception apparatus of claim 1, wherein said determiner comprises:
   a D-flip flop that receives as input, data to be corrected, and as gate input, a delayed judge result; and
   an X-NOR gate that receives as input, an output of said D-flip flop and said judged result.

* * * * *

UNITED STATES PATENT AND TRADEMARK OFFICE
CERTIFICATE OF CORRECTION

PATENT NO. : 7,062,245 B2  Page 1 of 1
APPLICATION NO. : 09/739817
DATED : June 13, 2006
INVENTOR(S) : K. Miyano et al.

It is certified that error appears in the above-identified patent and that said Letters Patent is hereby corrected as shown below:

At column 1, tine 37 of the printed patent, "Is" should be --is--.
At column 1, line 37 of the printed patent, "'0 or 0'" should be -- "1 or 0"--.
At column 5, line 23 of the printed patent, "Is" should be --is--.
At column 3, line 16 of the printed patent, "comparing circuit 117" should be --comparing circuit 116--.
At column 3, line 54 of the printed patent, "polarization antenna 106" should be --polarization antenna 107--.
At column 6, line 16 of the printed patent, "multiplier 303" should be --multiplier 301--.
At column 6, line 17 of the printed patent, "transmission signal 303" should be --transmission signal 302--.
At column 6, line 20 of the printed patent, "transmission signal 303" should be --transmission signal 302--.
At column 6, line 33 of the printed patent, "D-flip flop" should be --D-flip flop 401--.

Signed and Sealed this

Twelfth Day of December, 2006

JON W. DUDAS
*Director of the United States Patent and Trademark Office*